O. WHITE.
MERCURY MOTOR METER.
APPLICATION FILED JULY 5, 1921.
1,413,817. Patented Apr. 25, 1922.
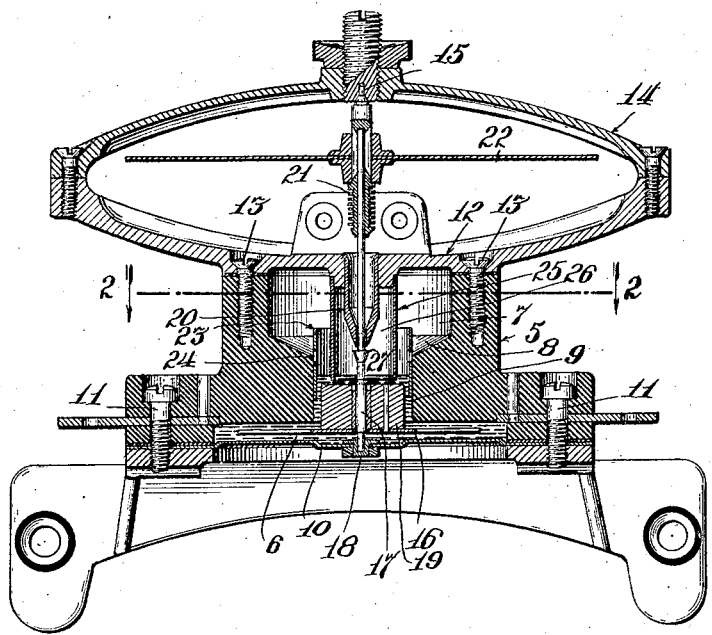
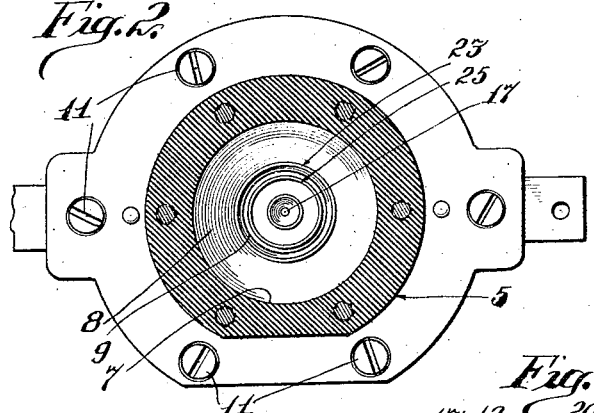
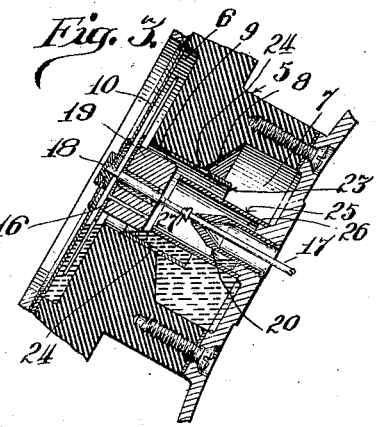
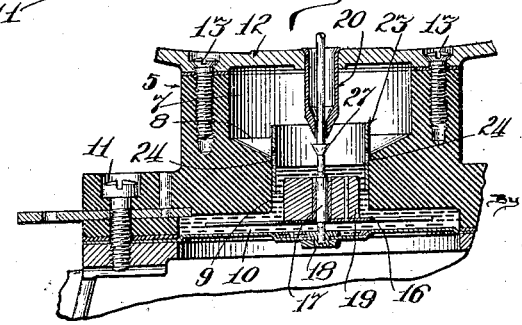
Inventor.
Otis White,
By Adams & Jameson
Attorneys.
Witness
Milton Lenoir

UNITED STATES PATENT OFFICE.

OTIS WHITE, OF SPRINGFIELD, ILLINOIS, ASSIGNOR TO SANGAMO ELECTRIC COMPANY, OF SPRINGFIELD, ILLINOIS, A CORPORATION OF ILLINOIS.

MERCURY MOTOR METER.

1,413,817.   Specification of Letters Patent.   Patented Apr. 25, 1922.

Application filed July 5, 1921. Serial No. 482,638.

*To all whom it may concern:*

Be it known that I, OTIS WHITE, a citizen of the United States, and a resident of Springfield, in the county of Sangamon and State of Illinois, have invented certain new and useful Improvements in Mercury Motor Meters, of which the following is a specification, reference being had to the accompanying drawings.

My invention relates to electricity meters of the type comprising a rotary disc armature operating in a bath of mercury contained in a suitable chamber through which the meter operating current is conducted. The mercury chamber is usually closed by a cover plate, and the rotation of the armature actuates the usual registering train through an armature shaft which passes through the cover plate and is provided with a worm or other suitable mechanism for that purpose. In meters of this description it is of the utmost importance that the armature shaft rotate freely in order that error on light loads may be avoided, and it is therefore desirable that there be no frictional contact between the cover plate and the armature shaft at the point where said shaft passes through the opening provided for that purpose in said plate. It is also necessary, however, to provide means for preventing the mercury from escaping through such opening if the meter be agitated, tilted or upset, as occurs especially in transportation, and various expedients have heretofore been employed to insure against spilling of the mercury in such circumstances. A construction which has been successfully used for this purpose is shown and described in patent to A. L. Emens, No. 1,226,956, dated May 22, 1917, and comprises a nipple which depends from the cover plate around the opening through which the armature shaft passes, and means between the nipple and the lower portion of the mercury chamber for protecting the nipple from direct impact of the body of mercury in said chamber if the meter should be tipped, the construction shown in said patent for that purpose being in the form of a second nipple which embraces the first and forms therewith an intermediate chamber which catches and, while the meter is tilted or inverted, retains any mercury which passes the outer nipple.

My present invention has for its object to provide an improved construction for preventing spilling of the mercury, which while making use of the generic feature of employing a nipple in connection with means for protecting it from direct impact of the body of mercury in the mercury chamber, as pointed out in said Emens patent, will insure greater accuracy of the meter on very light loads than can be obtained under all conditions where an outer nipple having a constricted opening, such as that shown in said Emens patent, is employed, as will be hereinafter explained. The nature of my improvements will clearly appear from the following description of the embodiment thereof illustrated in the accompanying drawings. What I regard as new is set forth in the claims.

In the accompanying drawings,—

Fig. 1 is a central vertical section through the mercury chamber of a meter of the type referred to;

Fig. 2 is a horizontal section on line 2—2 of Fig. 1;

Fig. 3 is a partial central vertical section showing the position assumed by the mercury when the meter is tipped nearly over; and Fig. 4 is a view showing a simplified construction by which certain advantages of my invention may be realized, but which does not embody all the improvements shown in the other figures.

Referring to the drawings, which show such parts of a meter as are necessary to a full understanding of my invention, 5 indicates a casing of suitable non-conducting material, such as bakelite, which encloses a mercury chamber comprising a lower armature-containing compartment 6, an upper compartment 7, the lower portion of which is conical as shown at 8, and a connecting neck 9 which affords communication between said upper and lower compartments. The bottom of the lower compartment 6 is formed by a disc or plate 10 which is secured in place by screws 11 in the usual way. The top or cover of the upper compartment 7 is formed by a plate 12 which is secured in place by screws 13. This cover plate is preferably formed integral with the lower member of a yoke or frame 14 which supports a bearing 15 for the upper end of the armature shaft of the meter.

Mounted in the lower compartment 6 is a disc armature 16 of any suitable design, which is secured to a shaft 17 which rises through an opening in the cover plate 12 and is pivoted at its upper end in the bearing 15, the lower end of said armature shaft being preferably pivoted in a bearing 18 provided in the bottom plate 10. At its upper side around the armature shaft the armature 16 is provided with a float 19, of wood or other suitable material, to give it buoyancy. Depending from the cover plate 12 around the armature shaft is a nipple 20, the lower end of which is provided with an opening large enough to permit the armature shaft to pass freely through it without coming into contact with it, but small enough so that mercury cannot readily flow through it. 21 indicates a worm carried by the armature shaft for connecting it with the usual registering train, and 22 indicates the usual damping disc carried by the armature shaft. The construction as thus far described is old, and as the operation of meters of this type is well understood it need not be explained at this time. It will be understood that the normal level of the mercury in the mercury chamber stands at or slightly above the top of the float 19, as indicated in Fig. 1.

Coming now to my improvements as incorporated in the meter illustrated, 23 indicates a tubular shield which fits snugly in the throat or passage 9 between the lower and upper compartments 6, 7, and extends a short distance above the bottom of the upper compartment, preferably to a point slightly above the highest point of such conical bottom, and above the opening into the nipple 20, as shown in Fig. 1, although the height of the upper margin of said shield may be varied considerably without materially affecting its operation. This shield is provided with one or more holes 24 adjacent to the lowest portion of the bottom 8 of the upper compartment, so that any mercury contained in such compartment around the upper portion of such shield may flow back into the throat 9 when the meter is turned to an upright position. A second somewhat smaller tubular shield 25 depends from the cover plate 12, to which it is secured in such position that it encircles the nipple 20. This shield 25 is of considerably greater diameter than the nipple 20 so that a chamber 26 is formed between them, and its lower end is wide mouthed, that is to say, it is not constricted to such an extent as would interfere with the free escape from the chamber 26 of any mercury caught therein because of the upsetting or tipping of the meter, as is shown for example in Fig. 3. The lower end of the shield 25 extends down into the shield 23 approximately to the normal level of the mercury in the throat 9. A conical baffle 27 is mounted upon the armature shaft 17 a short distance below the lower end of the nipple 20, the larger diameter of said baffle being at its upper end.

If the meter shown in Fig. 1 be tipped comparatively slowly it will be evident that the mercury in the lower portion of the mercury chamber will flow out of the throat 9 through the shield 23, either through the holes 24 or through the open upper end of said shield, into the upper compartment 7 where it will assume approximately the position shown in Fig. 3. A small portion of the mercury also will pass into the chamber 26 between the depending shield 25 and the nipple 20. None of it, however, will pass out through the nipple because it will not have access to the opening therethrough. If the meter were turned over violently the result would be the same except that some of the mercury might splash against the baffle 27, but any such mercury would be directed away from the opening through the nipple and would fall into the chamber 26. If the meter were completely inverted the greater part of the mercury would still be retained in the chamber 7 while a small portion of it would be held in the chamber 26. Under any of these conditions agitation or shaking of the meter would not cause any of it to pass out through the nipple as the greater part of the mercury would not be thrown into the chamber 26 by any such agitation, and such small portion thereof as might be contained in the chamber 26 has insufficient mass to cause it to be splashed into the opening through the nipple. It will be seen, therefore, that no matter what the position of the meter may be there is no danger of any appreciable part of the mercury escaping through the nipple. If any minute particles should by any chance get into the nipple the inversion of the meter will cause them to run out through the nipple into the outer part of the meter, so that they will not interfere with the freedom of movement of the armature shaft when the meter is restored to its upright position. In this connection it will be well to explain that an important advantage in making the depending shield 25 wide mouthed is that it permits the mercury contained in the chamber 26 to return freely to the lower portion of the meter when the latter is restored to its upright position, and it is not held in contact with the armature shaft, as might be the case if said shield were provided with an opening of only slightly greater diameter than the armature shaft. Owing to the high surface tension of mercury and lack of pressure any globules which might be pocketed in contact with the armature shaft in a construction such as that just suggested, would not pass freely around the armature shaft back into the mercury chamber, but would tend to fill the space around the shaft, thereby creating a tension or friction between the shaft and the surrounding shield which would interfere with the free rotation of the armature and make the meter erratic on very light load. This objection is avoided by the construction shown, since the escape of the mercury from the chamber 26 when the meter is returned to its upright position is unimpeded. When the meter is righted after having been tilted or upset the mercury in the compartment 7 flows back into the lower compartment and throat through the holes 24 in the shield 23, and at this time is prevented from splashing into the opening through the nipple 20 by the upper portion of the shield 23, by the lower portion of the shield 25, and by the baffle 27, all of which cooperate to that end.

In Fig. 4 I have illustrated the same construction with the exception that the depending shield 25 is omitted. Obviously many of the advantages of the construction shown in the other figures may be realized by the construction shown in Fig. 4, as even in the absence of the depending shield 25 the shield 23 acts to prevent any considerable body of mercury from coming into contact with or being thrown against the opening into the nipple 20 by inversion or agitation of the meter, which result is further promoted by the use in connection with the shield 23 of the baffle 27.

What I claim as my invention and desire to secure by Letters Patent, is—

1. A mercury motor meter comprising a mercury chamber, a cover for said chamber, an armature shaft extending through an opening in the cover, a nipple depending from the cover around the armature shaft, and a tubular shield in the mercury chamber rising above the normal level of the mercury therein.

2. A mercury motor meter comprising a mercury chamber, a cover for said chamber, an armature shaft extending through an opening in the cover, a nipple depending from the cover around the armature shaft, and a tubular shield in the mercury chamber rising above the normal level of the mercury therein and above the lower end of said nipple.

3. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, and a tubular shield in the mercury chamber rising above the normal level of the mercury therein, and extending into said upper compartment.

4. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, and a tubular shield in the mercury chamber rising above the normal level of the mercury therein, and extending into said upper compartment to a point above the lower end of said nipple.

5. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, and a tubular shield in the mercury chamber rising above the normal level of the mercury therein, and extending into said upper compartment, said shield having one or more openings for the return of mercury from said upper compartment to the lower portion of the mercury chamber.

6. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, and a tubular shield in the mercury chamber rising above the normal level of the mercury therein, and extending into said upper compartment to a point above the lower end of said nipple, said shield having one or more openings for the return of mercury from said upper compartment to the lower portion of the mercury chamber.

7. A mercury motor meter comprising a mercury chamber, a cover for said chamber, an armature shaft extending through an opening in the cover, a nipple depending from the cover around the armature shaft, a wide mouthed tubular shield depending from the cover around said nipple, and means between said nipple and the lower portion of the mercury chamber for protecting said nipple from direct impact of the body of mercury therein when the meter is tipped.

8. A mercury motor meter comprising a mercury chamber, a cover for said chamber, an armature shaft extending through an opening in the cover, a nipple depending from the cover around the armature shaft, a wide mouthed tubular shield depending from the cover around said nipple, and a baffle carried by the armature shaft below said nipple for protecting said nipple against direct impact of mercury when the meter is tipped.

9. A mercury motor meter comprising a mercury chamber, a cover for said chamber, an armature shaft extending through an opening in the cover, a nipple depending from the cover around the armature shaft, a baffle on the armature shaft below said nipple, and a wide mouthed tubular shield depending from the cover around said nipple and extending below said baffle.

10. A mercury motor meter comprising a mercury chamber, a cover for said chamber, an armature shaft extending through an opening in the cover, a nipple depending from the cover around the armature shaft, a tubular shield depending from the cover around said nipple, and a tubular shield extending up into the mercury chamber around said depending tubular shield.

11. A mercury motor meter comprising a mercury chamber, a cover for said chamber, an armature shaft extending through an opening in the cover, a nipple depending from the cover around the armature shaft, a tubular shield depending from the cover around said nipple, a tubular shield extending up into the mercury chamber around said depending tubular shield, and a conical baffle carried by the armature shaft below said nipple and above the lower end of said depending shield.

12. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, a tubular shield in the mercury chamber rising above the normal level of the mercury therein, and a tubular shield depending from the cover around said nipple and extending into the upper end portion of said first-mentioned shield.

13. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, a tubular shield in the mercury chamber rising above the normal level of the mercury therein and having one or more openings for the flow of mercury from said upper compartment into the lower portion of the mercury chamber, and a tubular shield depending from the cover around said nipple and extending into the upper end portion of said first-mentioned shield.

14. A mercury motor meter comprising a mercury chamber having a funnel-shaped upper compartment, an armature compartment in said chamber below said upper compartment, a cover for said chamber, an armature shaft extending through an opening in the cover, a nipple depending from the cover around the armature shaft, a tubular shield in the mercury chamber rising above the normal level of the mercury therein, a tubular shield depending from the cover around said nipple and extending into the upper end portion of said first-mentioned shield, and a conical baffle carried by the armature shaft below said nipple.

OTIS WHITE.